United States Patent
Granstrom et al.

(10) Patent No.: US 9,104,881 B2
(45) Date of Patent: Aug. 11, 2015

(54) IDENTIFYING UNAUTHORIZED CONTENT PRESENTATION WITHIN MEDIA COLLABORATIONS

(71) Applicant: Google Inc., Mountain View, CA (US)

(72) Inventors: Johan Georg Granstrom, Zurich (CH); Stephane Zermatten, Zurich (CH); Tristan Schmelcher, Seattle, WA (US); Gang Ji, Bothell, WA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/853,270

(22) Filed: Mar. 29, 2013

(65) Prior Publication Data

US 2014/0298475 A1 Oct. 2, 2014

(51) Int. Cl.
*G06F 21/00* (2013.01)
*G06F 21/60* (2013.01)
*G06F 21/10* (2013.01)

(52) U.S. Cl.
CPC .............. *G06F 21/60* (2013.01); *G06F 21/10* (2013.01)

(58) Field of Classification Search
CPC ................................. G06F 21/60; G06F 21/10
USPC ............................................................ 726/26
See application file for complete search history.

(56) References Cited

U.S. PATENT DOCUMENTS 8,520,018 B1 *  8/2013  Edelstein ...................... 345/531
2003/0018792 A1 *  1/2003  Shiouchi et al. ............. 709/229
2003/0037010 A1 *  2/2003  Schmelzer .................... 705/67
2004/0049648 A1 *  3/2004  Sato et al. .................... 711/164
2004/0062527 A1 *  4/2004  Kuroda .......................... 386/94
2005/0228858 A1 * 10/2005  Mizutani et al. ............. 709/201
2005/0232423 A1 * 10/2005  Horvitz et al. ............... 380/255
2006/0031870 A1 *  2/2006  Jarman et al. ................. 725/25
2007/0041031 A1 *  2/2007  Kaneko ...................... 358/1.14
2008/0059536 A1 *  3/2008  Brock et al. ................. 707/200

(Continued)

FOREIGN PATENT DOCUMENTS

JP          2004343515 A   * 12/2004  ............... H04N 7/15
WO       20090875111 A1      7/2009
WO         2010138466 A1     12/2010

OTHER PUBLICATIONS

International Search Report and Written Opinion of the International Searching Authority dated Jun. 23, 2014 for PCT/US2014/032077.

*Primary Examiner* — Michael Pyzocha
(74) *Attorney, Agent, or Firm* — Lowenstein Sandler LLP (57) ABSTRACT

Systems and methods are disclosed for identifying unauthorized presentation of protected content by one or more participants in a media collaboration. In one implementation, a processing device receives one or more content elements, each of the one or more content elements being provided within a media collaboration and associated with one or more users. The processing device identifies an unauthorized presentation of at least one of the one or more content elements within the media collaboration. Based on an identification of the unauthorized presentation, the processing device initiates one or more actions with respect to one or more of the users associated with the at least one of the one or more content elements.

20 Claims, 6 Drawing Sheets (56) References Cited

U.S. PATENT DOCUMENTS

| | | | |
|---|---|---|---|
| 2008/0133736 A1* | 6/2008 | Wensley et al. | 709/224 |
| 2009/0144325 A1* | 6/2009 | Chastagnol et al. | 707/104.1 |
| 2009/0254965 A1* | 10/2009 | Smith et al. | 725/134 |
| 2010/0106537 A1* | 4/2010 | Yuasa et al. | 705/7 |
| 2011/0004944 A1* | 1/2011 | Shen | 726/30 |
| 2012/0017149 A1* | 1/2012 | Lai et al. | 715/716 |
| 2012/0272336 A1 | 10/2012 | Cohen | |
| 2013/0135180 A1* | 5/2013 | McCulloch et al. | 345/8 |
| 2013/0144950 A1* | 6/2013 | Sanakaranarasimhan et al. | 709/204 |
| 2013/0145284 A1* | 6/2013 | Anantharaman et al. | 715/753 |
| 2013/0298151 A1* | 11/2013 | Leske et al. | 725/25 |
| 2014/0033265 A1* | 1/2014 | Leeds et al. | 726/1 |
| 2014/0040142 A1* | 2/2014 | Saito | 705/57 |
| 2014/0152760 A1* | 6/2014 | Granstrom et al. | 348/14.08 |

* cited by examiner

IDENTIFYING UNAUTHORIZED CONTENT PRESENTATION WITHIN MEDIA COLLABORATIONS

TECHNICAL FIELD

Aspects and implementations of the present disclosure relate to data processing, and more specifically, to identifying unauthorized content presentation within a media collaboration.

BACKGROUND

Video collaborations over the Internet (e.g., video conferences, telemedicine, etc.) are becoming increasingly common as broadband access and applications that take advantage of broadband connectivity proliferate. Applications for supporting video collaborations may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives one or more content elements, each of the one or more content elements being provided within a media collaboration and associated with at least one of a plurality of users. The processing device identifies an unauthorized presentation of at least one of the one or more content elements within the media collaboration. Based on an identification of the unauthorized presentation, the processing device initiates one or more actions with respect to one or more of the plurality of users associated with the at least one of the one or more content elements.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to identifying unauthorized presentation of protected content by one or more participants in a media collaboration. The systems and methods disclosed can be applied to media collaborations (e.g., audio and/or video conferences, audio and/or video chat, audio and/or video conference rooms, audio and/or video chat rooms, etc.) in which media streams (e.g., live audio and/or video content, recorded audio and/or video content, etc.) that are transmitted by one or more participants/users are combined into a composite media stream. More particularly, the unauthorized presentation/dissemination of protected content (e.g., copyrighted material) within such media collaborations can be problematic, and it can thus be advantageous to identify and curtail the incidence of such unauthorized presentations. While in certain scenarios (such as collaborations involving relatively few participants) it can be advantageous to terminate a collaboration upon identifying an unauthorized presentation of protected content within the collaboration (e.g., the display of a copyrighted movie or the playing of a copyrighted song), in other scenarios (such as collaborations involving relatively many participants), terminating the collaboration may be impractical or disadvantageous. Accordingly, described herein in various embodiments are technologies that enable the identification of the particular user(s) associated with an unauthorized presentation and the initiation of one or more actions with respect to such user(s). In doing so, the identified user(s) can, for example, be warned and/or blocked from further participation in the collaboration, while allowing the collaboration itself to continue without interruption to the non-offending participants.

Figure 1:
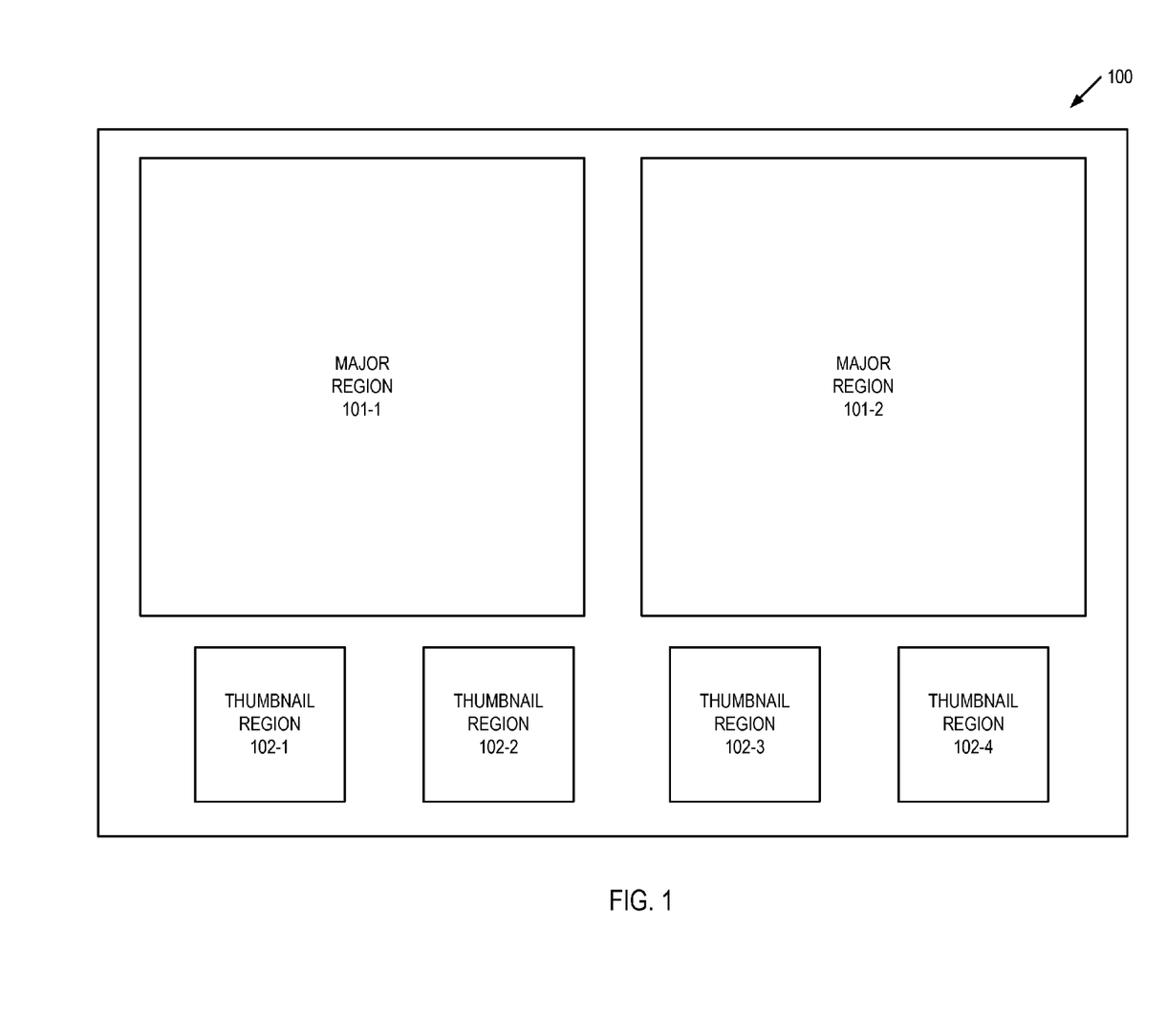
FIG. 1 depicts an illustrative screen of a composite media stream, in accordance with one implementation of the present disclosure.

FIG. 1 depicts an illustrative screen 100 of a composite audio/video stream associated with an audio/video collaboration, in accordance with one implementation of the present disclosure. As shown in FIG. 1, screen 100 comprises two major regions 101-1 and 101-2 and four thumbnail regions 102-1 through 102-4, where each of the regions is associated with a respective participant/user. In certain implementations, each region can contain, depict, or otherwise present media content (e.g., video content) provided by a particular participant in a media collaboration. Thus, for example, the major regions 101-1 and 101-2 may contain video streams transmitted by a first participant and a second participant, respectively (e.g., "rooms" of the first and second participants in a video conference, video clips shared by the first and second participants, etc.), while each of the thumbnail regions may contain a miniaturized version of a video stream transmitted by a participant, or simply a static image (e.g., an avatar, etc.) associated with the participant or video stream. In one implementation, a thumbnail region may transform into a major region (e.g., in response to a participant clicking on the thumbnail region or otherwise activating the thumbnail region), and vice versa. It should be noted that although the regions of screen 100 are depicted as rectangular, one or more of the regions may have some other shape (e.g., a circle, a trapezoid, etc.). Moreover, in certain implementations a particular region can change (e.g., from a thumbnail region to a major region) depending on whether the participant associated with the region is speaking or not.

Moreover, one or more participants in an audio/video (audio and/or video) collaboration can transmit or otherwise provide audio streams (not shown) that can be incorporated into an audio/video collaboration. In certain implementations, such audio streams can be provided independent of a video stream (e.g., a participant providing audio-only input during an audio/video collaboration), while in other implementations such audio streams can be provided in conjunction with a video stream (e.g., a combined stream, incorporating synchronized video and audio of a participant talking).

In accordance with one implementation, a first server machine combines the individual audio and/or video streams into a composite stream and embeds within the composite stream metadata that specifies geometric properties of the regions corresponding to the video streams as well as a region/participant mapping (an association between a participant and a region). The first server machine then transmits the composite stream to a second server machine that can identify the region from the metadata and/or analyze the stream or streams to determine whether one or more participants is/are broadcasting protected material. In one implementation, this is determined by generating fingerprints based on the stream(s) and matching the fingerprints against a repository that associates protected audio/video segments with fingerprints for the protected segments. Upon determining that a particular stream is in fact protected, one or more actions can be initiated/performed such as removing the region from the composite stream, transmitting a warning notification to the participant(s) broadcasting the protected material, removing the participant(s) from the collaboration, replacing the stream with other content, terminating the collaboration, and so forth.

Aspects and implementations of the present disclosure are thus capable of detecting and blocking the broadcasting of protected material by participants in a collaboration. In addition, while aspects and implementations of the present disclosure are disclosed in the context of audio/video collaborations, the techniques disclosed are applicable to any application in which a multiple media streams are combined into a composite stream.

Figure 2:
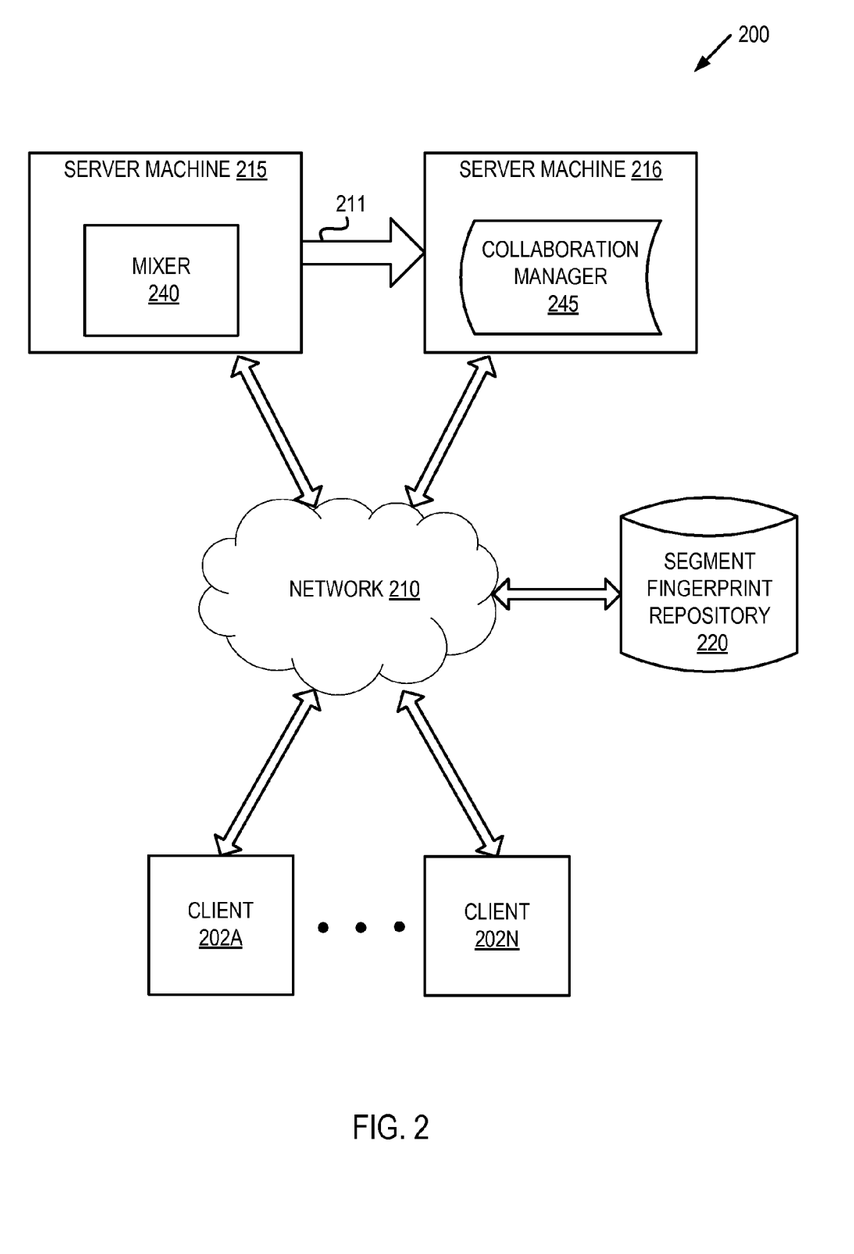
FIG. 2 depicts an illustrative system architecture, in accordance with one implementation of the present disclosure.

FIG. 2 depicts an illustrative system architecture 200, in accordance with one implementation of the present disclosure. The system architecture 200 includes a server machine 215, a server machine 216, a segment fingerprint repository 220, and client machines 202A-202N connected to a network 210. Network 210 may be a public network (e.g., the Internet), a private network (e.g., a local area network (LAN) or wide area network (WAN)), or a combination thereof.

The client machines 202A-202N may be wireless terminals (e.g., smartphones, etc.), personal computers (PC), laptops, tablet computers, or any other computing or communication devices. The client machines 202A-202N may run an operating system (OS) that manages hardware and software of the client machines 202A-202N. A browser (not shown) may run on the client machines (e.g., on the OS of the client machines). The browser may be a web browser that can render pages of a server-side web audio/video collaboration application, or that can run browser-based applications (e.g., a Java-based audio/video collaboration applet launched via a website, etc.). The client machines 202A-202N may run audio/video collaboration applications (e.g., mobile apps) that are not browser-based, and may transmit audio and/or video streams (e.g., live footage via a Web camera and/or microphone, recorded footage of an event, movie clips, audio content, etc.) to server machine 215 for processing and distribution to other client machines involved in an audio/video collaboration (e.g., active participants who also transmit video and/or audio streams, passive participants or "lurkers" who view the video streams of active participants but do not transmit their own video streams, etc.). The client machines 202A-202N may be geographically distributed anywhere throughout the world.

Segment fingerprint repository 220 is a persistent storage that stores fingerprints (e.g., quantitative data derived from features such as color, intensity, etc.) of protected media segments such as video and/or audio segments (e.g., copyrighted video and/or audio segments), as well as data structures to associate the copyrighted video and/or audio segments with their respective fingerprints (e.g., a table in which each row stores an identifier of an audio/video segment and fingerprint data for that audio/video segment, etc.). It should be noted that while various implementations are described herein with respect to respect to protected audio and/or video segments, in yet other implementations the technologies described herein can be similarly implemented with respect to other types of media, such as images. Segment fingerprint repository 220 may be hosted by one or more storage devices, such as main memory, magnetic or optical storage based disks, tapes or hard drives, NAS, SAN, and so forth. In some implementations, segment fingerprint repository 220 may be a network-attached file server, while in other implementations segment fingerprint repository 220 may be some other type of persistent storage such as an object-oriented database, a relational database, and so forth, that may be hosted by the server machine 216 or one or more different machines coupled to the server machine 216 via the network 210, while in yet other implementations segment fingerprint repository 220 may be a database that is hosted by another entity (e.g., a movie studio, a recording label, etc.) and made accessible to server machine 216.

Server machines 215 and 216 may cooperate to provide a video conference system that manages video conferences created and/or participated by users of client devices 202. Video conferences may be enabled using, for example, streaming video or voice over IP (VoIP) technologies and may be used for personal, entertainment, business or educational or academically oriented interactions. The server machines 215 and 216 may be dedicated to providing video conferencing services or may provide video conferencing services along with other services including, for example, news services, social networking services and/or content hosting services. For instance, any of the server machines 215 and 216 may allow a user to view a video clip or a news article and start a video conference while viewing the video clip or the news article. In another example, any of the server machines 215 and 216 may allow a user to start a video conference while visiting a social networking site or video content hosting site. In some implementations, the video conference system provided by the server machines 215 and 216 includes a mixer 240 and a collaboration manager 245.

Server machine 215 may be a rackmount server, a router computer, a personal computer, a portable digital assistant, a mobile phone, a laptop computer, a tablet computer, a camera, a video camera, a netbook, a desktop computer, a media center, or any combination of the above. Server machine 215 includes a mixer 240 that combines individual video and/or audio streams of participants into a composite audio/video stream (e.g., as depicted in FIG. 1, etc.), embeds metadata into the composite audio/video stream comprising geometric properties of the regions (e.g., region coordinates, region dimensions, etc.) associated with participants' video stream and transmits the composite audio/video stream to server machine 216 via a network connection such as a broadband pipeline 211. It should be noted that in some implementations in which audio/video collaborations are supported by a browser-based application, server machine 215 may also include a web server that hosts a website through which users can join and view audio/video collaborations.

Server machine 216 may be a rackmount server, a router computer, a personal computer, a portable digital assistant, a mobile phone, a laptop computer, a tablet computer, a camera, a video camera, a netbook, a desktop computer, a media center, or any combination of the above. Server machine 216 includes a collaboration manager 245 that receives a composite audio/video stream associated with an audio/video collaboration, determines whether the composite audio/video stream contains protected content, performs one or more actions when one or more regions contain protected material (e.g., transmitting a warning to a participant providing/broadcasting the protected material, removing the offending audio/video stream from the composite stream, etc.), and then distributes the composite stream to participants of the audio/video collaboration. It should be noted that in some implementations, server machine 216 may distribute the composite stream to participants of the audio/video collaboration via server machine 215 (e.g., via web server hosted by server machine 215, etc.), rather than directly. An implementation of collaboration manager 245 is described in detail below with respect to FIG. 3, and some operations of collaboration manager 245 are described in detail below with respect to FIG. 4.

It should be noted that in some alternative implementations, server machine 215 may transmit composite streams to server machine 216 via network 210, or via some other conduit (e.g., a local area network not depicted in FIG. 2, etc.), instead of via a dedicated broadband pipeline 211. Similarly, in some alternative implementations server machines 215 and 216 may be combined into a single server machine, while in some other implementations, server machines 215 and 216 may be replicated and distributed over a plurality of geographical regions (e.g., a first instance of server machines 215 and 216 at a first location, a second instance of server machines 215 and 216 at a second location, etc.).

Figure 3:
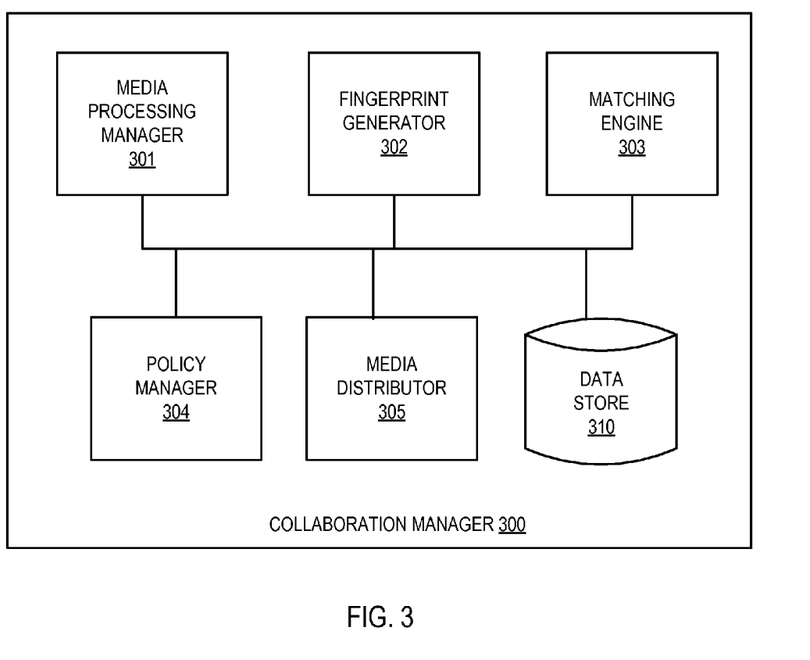
FIG. 3 depicts a block diagram of one implementation of a media collaboration manager.

FIG. 3 depicts a block diagram of one implementation of a collaboration manager 300. The collaboration manager 300 may be the same as the collaboration manager 225 of FIG. 2 and may include a media processing manager 301, a fingerprint generator 302, a matching engine 303, a policy manager 304, a media distributor 305, and a data store 310. The components can be combined together or separated in further components, according to a particular implementation. It should be noted that in some implementations, various components of collaboration manager 300 may run on separate machines.

The data store 310 may be the same as segment fingerprint repository 220 or a different data store (e.g., a temporary buffer or a permanent data store) to hold one or more fingerprints of protected audio and/or video streams to be stored in segment fingerprint repository 220, one or more fingerprints of current audio and/or video streams that are to be matched against segment fingerprint repository 220, one or more data structures for indexing the fingerprint-segment associations in segment fingerprint repository 220, one or more images or audio/video stream segments that are to be processed, image data (e.g., coordinates of regions, dimensions of regions, pixel values, etc.), or some combination of these data. Data store 310 may be hosted by one or more storage devices, such as main memory, magnetic or optical storage based disks, tapes or hard drives, and so forth.

The media processing manager 301 decodes and filters composite video streams, identifies from embedded metadata the regions of a composite video stream containing participants' individual video streams, and crops/re-sizes participants' individual video streams as appropriate to facilitate matching against repository 220. Some operations of media processing manager 301 are described in more detail below with respect to FIG. 4.

The fingerprint generator 302 generates one or more fingerprints of a segment of an audio and/or video stream provided by a participant by first obtaining a feature vector for using one or more techniques such as principal components analysis, semidefinite embeddings, Isomaps, partial least squares, etc., and then deriving one or more fingerprints from the feature vector (e.g., a locality-sensitive hashing of the feature vector, an encoding of the feature vector, etc.). In certain implementations, such segments can be selections, samples, or snippets of a particular content item, such as a snippet of an audio file, a snippet of a video file, etc.

The matching engine 303 matches fingerprints generated for one or more segments of an audio/video stream against segment/fingerprint repository 220. In one aspect, matching engine 303 employs a set of rules for matching fingerprints against the repository, while in another aspect, matching engine 303 compares fingerprints against a data structure (e.g., a hash table, etc.) that indexes the repository fingerprints. In yet other aspects, matching engine 303 employs one or more classifiers (e.g., a support vector machine [SVM], AdaBoost, a neural network, a decision tree, etc.) that are trained based on positive examples (e.g., video segments that are known to be protected) and negative examples (e.g., video segments that are known not to be protected), that accept the generated fingerprints (or a feature vector from which the fingerprints were derived) as input, and that output a score (e.g., a number between 0 and 1 inclusive, etc.) indicating the likelihood that the stream contains protected material, while in still other aspects, matching engine 303 may employ a combination of these techniques.

In one aspect, matching engine 303 identifies protected audio/video segments or elements in repository 220 that match the audio/video stream provided by a particular participant, while in some other aspects, matching engine 303 may determine that such an audio/video stream contains protected content without identifying particular protected segments or elements that match the stream. Some operations of matching engine 303 are described in detail below with respect to FIG. 4.

The policy manager 304 determines (e.g., based on predefined policies or rules) one or more actions to initiate and/or perform in response to identifying protected segments that match an audio/video stream. These actions may include removing an unauthorized audio/video stream from a composite stream, replacing an unauthorized stream in the composite stream with alternative content (e.g., a static image containing a message that indicates that protected material is being blocked, a blank image, a different stream that does not contain protected material, etc.), terminating the entire audio/video collaboration, and so forth. In one aspect, which actions are taken may depend on any number of factors including the protected segments/elements (e.g., the type of content in the segments, the authors/publishers of the protected segments, the number of matching segments, etc.). Some operations of policy manager 304 are described in detail below with respect to FIG. 4.

The media distributor 305 processes the composite stream in accordance with one or more actions specified by policy manager 304 (e.g., removing a certain audio/video stream from the composite stream, blanking out a certain stream, providing a warning notification to a participant that provided a protected stream, etc.) and distributes the processed composite stream to participants of the audio/video collaboration (provided none of the actions are to terminate the audio/video collaboration).

Figure 4:
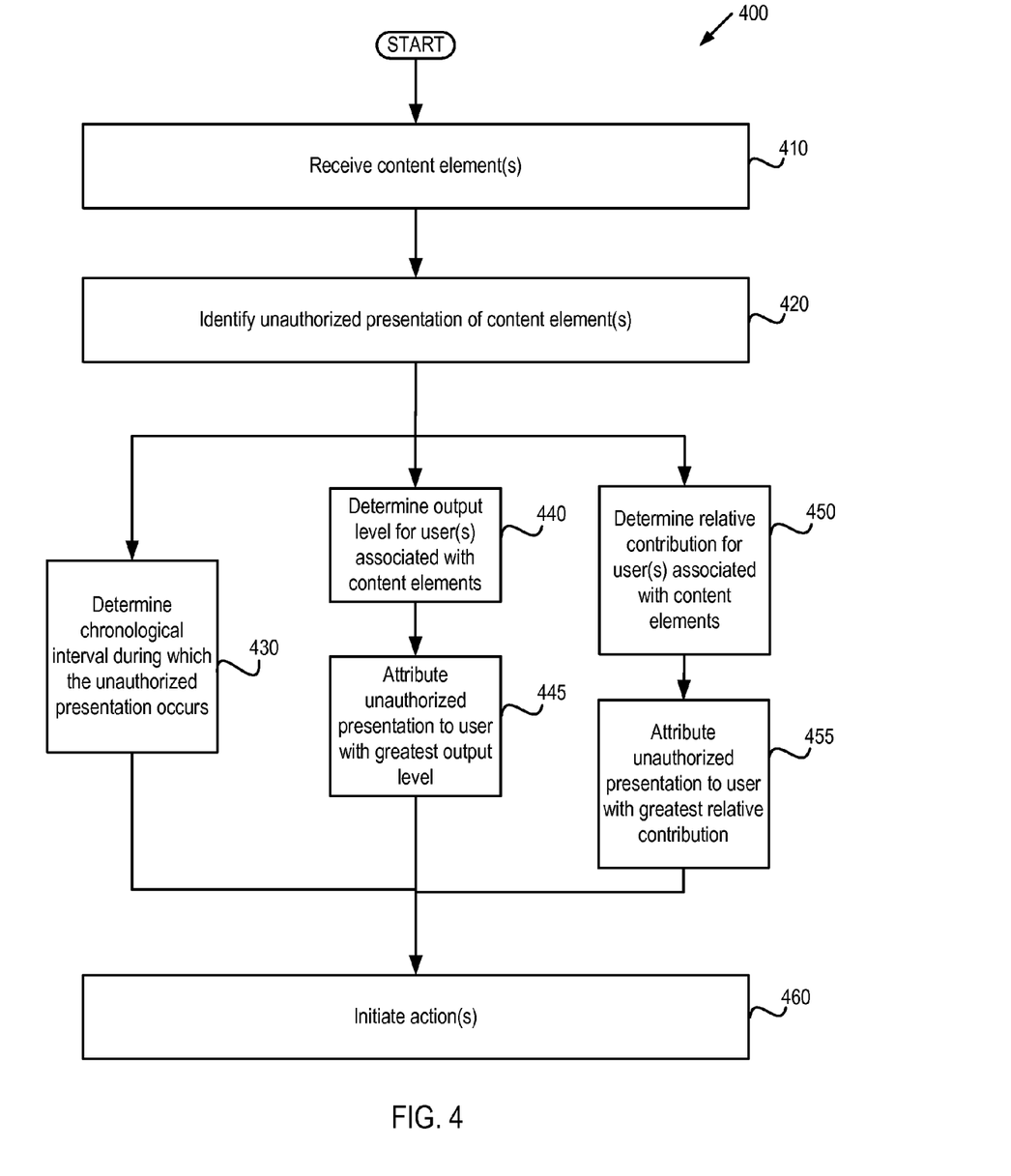
FIG. 4 depicts a flow diagram of aspects of a method for identifying an unauthorized presentation within a media collaboration in relation to one or more users.

FIG. 4 depicts a flow diagram of aspects of a method 400 for identifying an unauthorized presentation within a media collaboration in relation to one or more users. The method is performed by processing logic that may comprise hardware (circuitry, dedicated logic, etc.), software (such as is run on a general purpose computer system or a dedicated machine), or a combination of both. In one implementation, the method is performed by the server machine 216 of FIG. 2, while in some other implementations, one or more blocks of FIG. 4 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 410, one or more content elements are received. Examples of such content elements include video content elements (e.g., video files and/or streams) and audio content elements (such as audio files and/or streams). In certain implementations, each of the content elements can be associated with one or more participants/users, such as one or more participants in an audio/video collaboration. Moreover, in certain implementations the one or more content elements can be received as a media stream, such as a composite media stream that includes and/or is made up of one or more content elements. In accordance with one aspect, block 410 is performed by collaboration manager 245 of server machine 216.

Figure 5A:
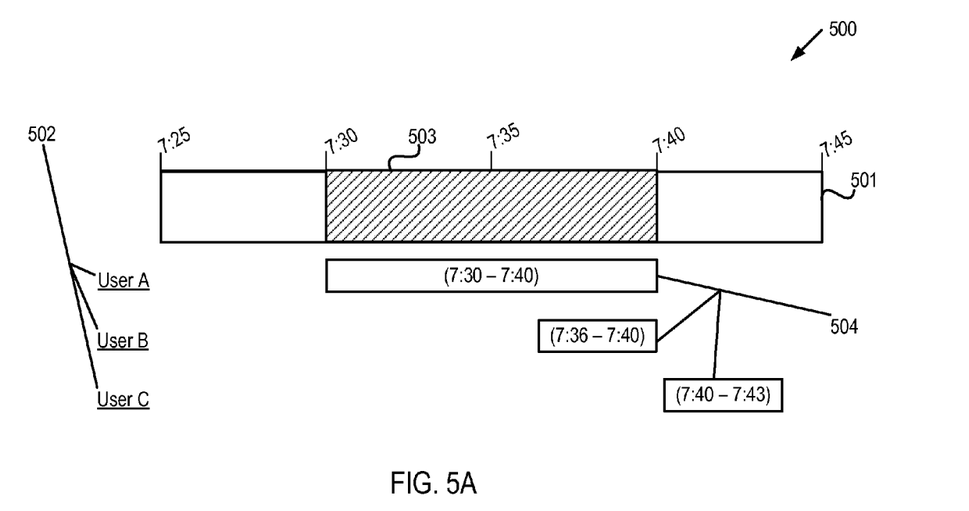
FIG. 5A depicts a schematic diagram showing the chronological progression of a media stream in relation to various users, in accordance with one implementation of the present disclosure.

For example, FIG. 5A depicts a schematic diagram 500 showing a chronological progression of a media stream 501 in relation to various users/participants 502 in an audio/video collaboration. It should be understood that media stream 501 can be a composite stream that integrates various content elements (e.g., video content, audio content, etc.) provided by users 502. As can be appreciated with reference to FIG. 5A, media stream 501 is depicted in a timeline format, showing various aspects of the stream as time progresses from left to right.

Also depicted in FIG. 5A are lines 504 that run parallel to the timeline of media stream 501 in relation to users 502. Lines 504 represent the respective contributions of each user to the composite media stream 501 at various points in time. Thus, for example, FIG. 5A shows that User A contributed to media stream 501 during one interval (7:30-7:40), while User C contributed to media stream 501 during another interval (7:40-7:43).

At this juncture, it should be noted that while in certain implementations the respective contributions of each user/participant can be identified (for example, by determining that one user provided video content to a composite stream while another user provided audio content to the stream), in other implementations it may not be advantageous and/or possible to make such identifications. Thus, with respect to a composite media stream (made up of content elements provided by multiple users), it may be possible or advantageous to identify the particular users that contributed content to the composite stream (and the time/duration of each contribution), though it may not be possible or advantageous to identify the content/substance of the respective contributions of each user (e.g., that User A contributed video content, that User B contributed audio content, etc.). For example, with respect to an audio stream made up of audio content elements provided by multiple users, it may be possible to identify the users that contributed to the stream while it may not be possible to identify the particular contributions of each user within the stream.

At block 420, an unauthorized presentation of at least one of the one or more content elements (such as the content elements received at block 410) is identified. Such an unauthorized presentation can be identified, for example, using one or more techniques such as fingerprint matching, as described in detail in relation to FIG. 3. In one aspect, block 420 is performed by matching engine 303. By way of illustration and with reference to FIG. 5A, Section 503 of media stream 501 reflects a segment or portion of the stream that has been determined to be protected content (e.g., copyrighted video content, audio content, etc.).

In certain implementations, the referenced content elements can be processed in relation to each of the users that are associated with such content elements. That is, in certain implementations, each content element (e.g., a video file, an audio stream, etc.) can be associated with any number of participants/users in an audio/video collaboration. For example, a particular content element can be associated with each of the users that are participating in an audio/video collaboration when the content element is presented. Thus, it can be appreciated with reference to FIG. 5A that User A contributed to media stream 501 during an interval (7:30-7:40) that protected content was identified in the stream, while User C contributed to media stream 501 during an interval (7:40-7:43) that protected content was not identified within the stream. It should be noted, however, that different users can have different degrees or levels of authorization with respect to presenting a particular content element. For example, one user may own the copyright of a particular content element, and thus be authorized to present such a content item within an audio/video collaboration while another user may not be so authorized with respect to the same content element. Thus, by processing a content element in relation to each of the users associated with such an element, a respective authorization state of the content element can be determined with respect to each of the participants/users. Examples of such an authorization state include an authorized state and/or unauthorized state.

By way of illustration and with reference to FIG. 5A, it can be appreciated that both User A and User B contributed to media stream 501 at various points during an interval 503 during which protected content was identified in the stream (for example, copyrighted audio content). However, in a scenario where User A is determined to be authorized to provide the protected content (e.g., User A is the copyright owner of the content, as can be determined in a manner described herein), the presentation of the protected content can be determined to be unauthorized only with respect to User B.

Moreover, in certain implementations, for each content element (such as the content elements received at block 410) a segment of the content element can be processed. In doing so, it can be determined whether or not the segment contains protected content (for example, whether or not the segment is part of an unauthorized presentation in relation to an associated user). Based on a determination that the processed segment contains protected content, the content element can be further processed. In doing so, a duration of the protected content within the content element can be determined. That is, having determined that at least a segment of a particular content element is part of an unauthorized presentation, additional segments and/or the entire content element can be processed in order to determine the duration of protected content within the content element. In doing so, various processing efficiencies and advantages can be realized by devoting relatively more processing resources towards those content elements initially determined to contain protected content while devoting relatively fewer processing resources towards those content elements not initially determined to contain protected content.

At block 430, a chronological interval during which the unauthorized presentation occurs is determined. For example, and with reference to FIG. 5A, the chronological interval of 7:30-7:40 can be identified, corresponding to a time interval during which protected content (i.e., section 503) was presented in media stream 501. In one aspect, block 430 is performed by media processing manager 301.

In certain implementations, the referenced users that are associated with one or more content elements include each of the users that are associated with content elements that are presented during a particular chronological interval (such as the chronological interval determined at block 430). For example, and with reference to FIG. 5A, User A and User B can be identified as having provided content within the determined chronological interval (i.e., 7:30-7:40). As noted above, it should be understood that while in certain implementations it may be possible or advantageous to identify the particular substantive contributions of each user (e.g., that User A contributed video content, that User B contributed audio content, etc.), in other implementations such identifications may not be possible or advantageous.

At block 440, an output level is determined for one or more of the users associated with the one or more content elements (such as the content elements identified at block 420 as being an unauthorized presentation). For example, and with reference to FIG. 5A, in a scenario where User A and User B both provide audio content, the audio content elements can be processed to determine respective audio output levels (e.g., volume, quality, etc.) for each content element. In one aspect, block 440 is performed by media processing manager 301.

At block 445, the unauthorized presentation (such as that identified at block 420) is attributed to a user having a greatest (or highest) determined output level (as determined, for example, at block 440). For example, and with reference to FIG. 5A, having determined that the output level of the audio content provided by User A is greater (or higher) than the output level of the audio content provided by User B, the unauthorized presentation (as represented by section 503) can be attributed to User A (and thus not to User B). In one aspect, block 445 is performed by policy manager 304.

At block 450, a relative contribution is determined for one or more of the users associated with the at least one of the one or more content elements (such as the content elements identified at block 420 as being an unauthorized presentation). For example, and with reference to FIG. 5A, the relative contributions of User A (providing content during 100% of the time duration of section 503) and User B (providing content during 40% of the time duration of section 503) can be determined. In one aspect, block 450 is performed by media processing manager 301.

At block 455, the unauthorized presentation (such as that identified at block 420) is attributed to a user having a greatest determined relative contribution (as determined, for example, at block 450). By way of illustration, and with reference to FIG. 5A, having determined that User A has the greatest relative contribution (with respect to the time duration of section 503), the unauthorized presentation can be attributed to User A (and thus not to User B). In one aspect, block 455 is performed by policy manager 304.

Figure 5B:
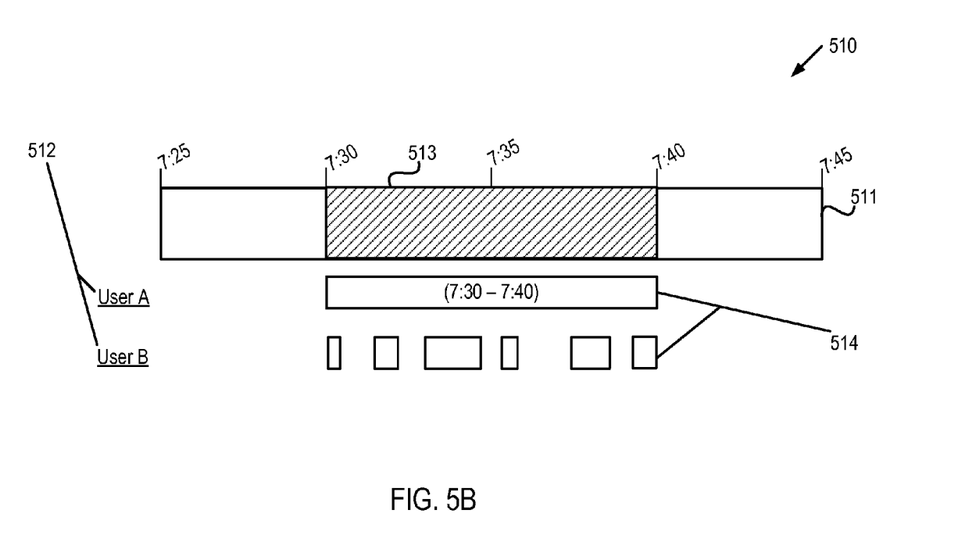
FIG. 5B depicts a schematic diagram showing the chronological progression of a media stream in relation to various users, in accordance with one implementation of the present disclosure.

In yet other implementations, various additional approaches or techniques can be employed with respect to determining a contribution of a particular user to an unauthorized presentation and/or attributing such an unauthorized presentation to one or more users. For example, in certain implementations the duration of an unauthorized presentation can be distributed across each of the users identified with the unauthorized presentation (e.g., for a 60 second unauthorized presentation duration associated with three users, 20 seconds of the unauthorized presentation can be attributed to each user). By way of further illustration, in certain implementations a preference or priority can be designated for certain content types. For example, video content can be prioritized over audio content, such that a user determined to be contributing video content during an unauthorized presentation interval can be attributed the entire duration of the interval, irrespective of the fact that other users may have also contributed audio content during the same interval. By way of yet further example, user(s) whose content contributions during an unauthorized presentation interval can be determined to be relatively more constant/consistent can be attributed the duration of the unauthorized presentation in lieu of other users whose content contributions are relatively less constant/consistent. For example, FIG. 5B depicts a schematic diagram 510 showing the chronological progression of a media stream 511 in relation to various users/participants 512. It can be appreciated with reference to FIG. 5B that while User A provides a single constant contribution over the course of interval 513, User B provides several short content contributions over the same interval. Accordingly, in certain implementations User A can be attributed the duration of interval 513 in lieu of distributing or otherwise attributing the interval to User B as well. It should be understood that the referenced attributions/distributions of the duration of an unauthorized presentation interval can be utilized, for example, in determining whether or not a particular action is to be initiated with respect to a particular user, as described in relation to block 460.

At block 460, one or more actions are initiated with respect to user(s) associated with the content elements (such as the content elements identified at block 420 as being an unauthorized presentation). In certain implementations, such actions are initiated based on an identification of the unauthorized presentation. In one aspect, block 460 is performed by policy manager 304.

In certain implementations, the referenced actions can be initiated with respect to users associated with the content elements based on a determination that a chronological interval (such as the chronological interval determined at block 430) exceeds a defined threshold. For example, one or more thresholds or rules can be defined whereby the referenced actions (or a particular action or actions) are initiated only with respect to unauthorized presentations that are of at least a certain duration (e.g., greater than two minutes). Moreover, in certain implementations the defined threshold can be adjusted based on a quantity of users that are associated with the content element(s) presented during the chronological interval. For example, such a threshold can be adjusted to be relatively larger based on a relatively greater quantity of users associated with the content element(s) presented, and relatively smaller based on a relatively smaller quantity of users associated with the content element(s). By way of illustration, a rule or threshold can be employed whereby the referenced actions (or a particular action or actions) are initiated with respect to unauthorized presentations that are greater than two minutes and associated with three or fewer users, while such (or other) actions are initiated with respect to unauthorized presentations that are greater than three minutes and associated with four or more users. Doing so can account for the fact that the presence of a greater number of users participating in a media collaboration during an interval during which an unauthorized presentation is identified makes it relatively less likely that any given user is providing the unauthorized content (i.e., it is likely that only one user is providing the unauthorized content while the remaining user(s) are participating appropriately).

Moreover, in certain implementations the referenced actions can be initiated with respect to each user with respect to which an authorization state of a particular content element is determined to be unauthorized (such as in a manner described in relation to block 420). For example, a notification (such as a warning notification) can be provided to user(s) associated with one or more content elements (such as the content element(s) identified at block 420 as being presented in an unauthorized manner), and/or an ability of such user(s) to provide content items and/or otherwise participate in a collaboration can be restricted. In doing so, the unauthorized presentation of protected content by a user or users can be curtailed while avoiding disruption of other users (i.e., users not associated with the unauthorized presentation) from continued participation in the collaboration.

Additionally, in certain implementations, an aggregate time duration of the unauthorized presentation can be determined. Such an aggregate time duration can be determined, for example, with respect to each user with respect to which the authorization state is unauthorized (such as in a manner described in relation to block 420). For example, it can be appreciated with reference to FIG. 5B that User B provides several short content contributions over the course of interval 513. Accordingly, the time durations of each of the contributions of a particular user (although not contiguous) can be aggregated, and the aggregate duration can be associated with the user, such as for the purpose of determining a contribution of the user, such as in the manner described at blocks 450 and 455.

Figure 6:
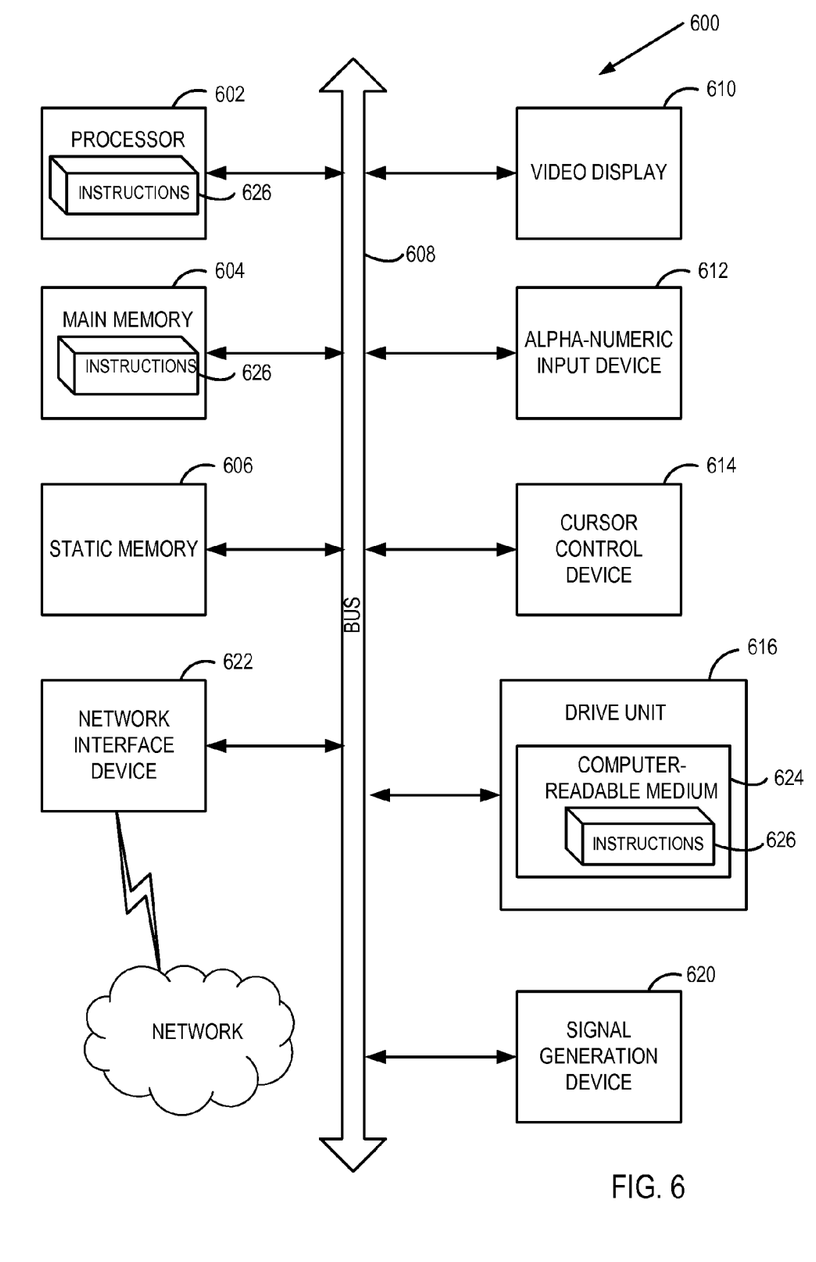
FIG. 6 depicts a block diagram of an illustrative computer system operating in accordance with aspects and implementations of the present disclosure.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "identifying," "initiating," "processing," "providing," "restricting," "attributing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
   receiving one or more content elements, each of the one or more content elements being provided within a media collaboration;
   identifying, with a processing device, an unauthorized presentation of at least one of the one or more content elements within the media collaboration;
   determining, with respect to each of a plurality of users associated with a chronological interval during which the unauthorized presentation occurs, a respective relative consistency of contribution to the at least one of the one or more content elements; and
   based on an identification of the unauthorized presentation and the respective relative consistency of contribution of one or more of the plurality of users associated with the chronological interval during which the unauthorized presentation occurs, initiating one or more actions with respect to the one or more of the plurality of users associated with the chronological interval during which the unauthorized presentation occurs.

2. The method of claim 1, further comprising determining the chronological interval during which the unauthorized presentation occurs.

3. The method of claim 2, wherein the one or more of the plurality of users associated with the chronological interval during which the unauthorized presentation occurs comprises each of at least one of a plurality of users that are associated with one or more content elements presented during the chronological interval.

4. The method of claim 2, wherein initiating one or more actions with respect to the one or more of the plurality of users associated with the chronological interval during which the unauthorized presentation occurs comprises initiating one or more actions with respect to one or more of a plurality of users associated with the at least one of the one or more content elements based on a determination that the chronological interval exceeds a defined threshold.

5. The method of claim 4, wherein the defined threshold is adjusted based on a quantity of the at least one of a plurality of users that are associated with the chronological interval during which the unauthorized presentation occurs.

6. The method of claim 1, wherein identifying an unauthorized presentation of at least one of the one or more content elements comprises processing the at least one of the one or more content elements in relation to each of the one or more of the plurality of users to determine an authorization state of the at least one of the one or more content elements with respect to each of the one or more of the plurality of users, the authorization state comprising at least one of authorized and unauthorized.

7. The method of claim 6, wherein initiating one or more actions with respect to one or more of the plurality of users comprises initiating one or more actions with respect to each of the one or more of the plurality of users with respect to which the authorization state of the one or more content elements is determined to be unauthorized.

8. The method of claim 1, wherein identifying an unauthorized presentation of at least one of the one or more content elements comprises determining an aggregate time duration of the unauthorized presentation.

9. The method of claim 1, wherein receiving one or more content elements comprises receiving a media stream, the media stream comprising the one or more content elements.

10. The method of claim 1, wherein identifying an unauthorized presentation of at least one of the one or more content elements comprises:
   for each of the one or more content elements,
      processing a segment of the content element, and
      based on a determination that the segment contains protected content, further processing the content element to determine a duration of the protected content within the content element.

11. The method of claim 1, wherein the one or more actions comprise at least one of: (a) providing a notification to the one or more of the plurality of users or (b) restricting an ability of the one or more of the plurality of users to provide content items.

12. The method of claim 1, further comprising:
    determining an output level for each of the plurality of users; and
    attributing the unauthorized presentation to a user having a greatest determined output level.

13. The method of claim 1, further comprising:
    determining a relative contribution for each of the plurality of users; and
    attributing the unauthorized presentation to a user having a greatest determined relative contribution.

14. The method of claim 1, wherein the one or more content elements comprises at least one of (a) a video content element and (b) an audio content element.

15. A system comprising:
    a memory; and
    a processing device, coupled to the memory, to:
        receive one or more content elements, each of the one or more content elements being provided within a media collaboration;
        identify an unauthorized presentation of at least one of the one or more content elements within the media collaboration;
        determine, with respect to each of a plurality of users associated with a chronological interval during which the unauthorized presentation occurs, a respective relative consistency of contribution to the at least one of the one or more content elements; and
        based on an identification of the unauthorized presentation and the respective relative consistency of contribution of one or more of the plurality of users associated with the chronological interval during which the unauthorized presentation occurs, initiate one or more actions with respect to the one or more of the plurality of users associated with the chronological interval during which the unauthorized presentation occurs.

16. The system of claim 15, wherein the processing device is further to determine the chronological interval during which the unauthorized presentation occurs.

17. The system of claim 16, wherein the one or more of the plurality of users associated with the chronological interval during which the unauthorized presentation occurs comprises each of at least one of a plurality of users that are associated with one or more content elements presented during the chronological interval.

18. The system of claim 15, wherein to identify an unauthorized presentation of at least one of the one or more content elements, the processing device is to process the at least one of the one or more content elements in relation to each of the one or more of the plurality of users to determine an authorization state of the at least one of the one or more content elements with respect to each of the one or more of the plurality of users, the authorization state comprising at least one of authorized and unauthorized.

19. The system of claim 18, wherein to identify an unauthorized presentation of at least one of the one or more content elements, the processing device is to determine, for each of the one or more of the plurality of users, an aggregate time duration of the unauthorized presentation.

20. A non-transitory computer readable medium having instructions stored thereon that, when executed by a processor, cause the processor to perform operations comprising:
    receiving one or more content elements, each of the one or more content elements being provided within a media collaboration;
    identifying, with a processing device, an unauthorized presentation of at least one of the one or more content elements within the media collaboration;
    determining with respect to each of a plurality of users associated with a chronological interval during which the unauthorized presentation occurs, a respective relative consistency of contribution to the at least one of the one or more content elements; and
    based on an identification of the unauthorized presentation and the respective relative consistency of contribution of one or more of the plurality of users associated with the chronological interval during which the unauthorized presentation occurs, initiating one or more actions with respect to each of at least one of a plurality of users that are associated with the chronological interval during which the unauthorized presentation occurs.

* * * * *